(12) United States Patent
Gottfredson et al.

(10) Patent No.: US 6,561,470 B1
(45) Date of Patent: May 13, 2003

(54) SYSTEM AND METHOD FOR TREATING OBJECT SURFACES

(75) Inventors: Don Elmo Gottfredson, Layton, UT (US); James F. Webb, Layton, UT (US)

(73) Assignee: Simplistic Tools & Systems Ltd, Layton, UT (US)

( * ) Notice: Subject to any disclaimer, the term of this patent is extended or adjusted under 35 U.S.C. 154(b) by 0 days.

(21) Appl. No.: 09/552,413

(22) Filed: Apr. 19, 2000

(51) Int. Cl.$^7$ ............................................. F16M 11/00
(52) U.S. Cl. ..................... 248/201; 248/202.1; 248/130
(58) Field of Search ............................. 248/201, 202.1, 248/130, 163.1, 440; 403/69, 70, 157, 162, 165; 118/500; 269/905

(56) References Cited

U.S. PATENT DOCUMENTS

| | | | | |
|---|---|---|---|---|
| 1,581,960 A | * | 4/1926 | King | |
| 3,807,720 A | * | 4/1974 | Converse et al. | 269/40 |
| 4,239,197 A | * | 12/1980 | Olstad | 269/68 |
| 4,880,194 A | * | 11/1989 | Geise et al. | 248/166 |
| 5,085,397 A | * | 2/1992 | Henkel | 248/688 |
| 5,090,648 A | * | 2/1992 | Wood, IV | 248/125 |
| 5,164,011 A | * | 11/1992 | Ray | 118/500 |
| 5,509,544 A | * | 4/1996 | Osborn | 211/190 |
| 6,090,204 A | * | 7/2000 | Speed et al. | 118/500 |

* cited by examiner

Primary Examiner—Anita King
Assistant Examiner—Steven Marsh
(74) Attorney, Agent, or Firm—David M Mason

(57) ABSTRACT

In a system for treating object surfaces, a first and a second object hanger, each comprising a plate and a shaft, are mounted upon an object such as a door that requires a surface treatment such as painting. The mounted object hangers may be placed into supporting braces on a treatment apparatus, whereupon the object can be rotated into a desired position. A positioning attachment upon each supporting brace selectively maintains the object in the desired position. Following surface treatment, the mounted object hangers may be placed into storage braces on a storage apparatus, such that any treated object surfaces may dry or cure. One storage brace includes an anchoring insert, which keeps an object hanger, and hence the object attached thereto, in a predetermined position. The storage apparatus may accommodate multiple objects in a side-by-side manner.

14 Claims, 10 Drawing Sheets

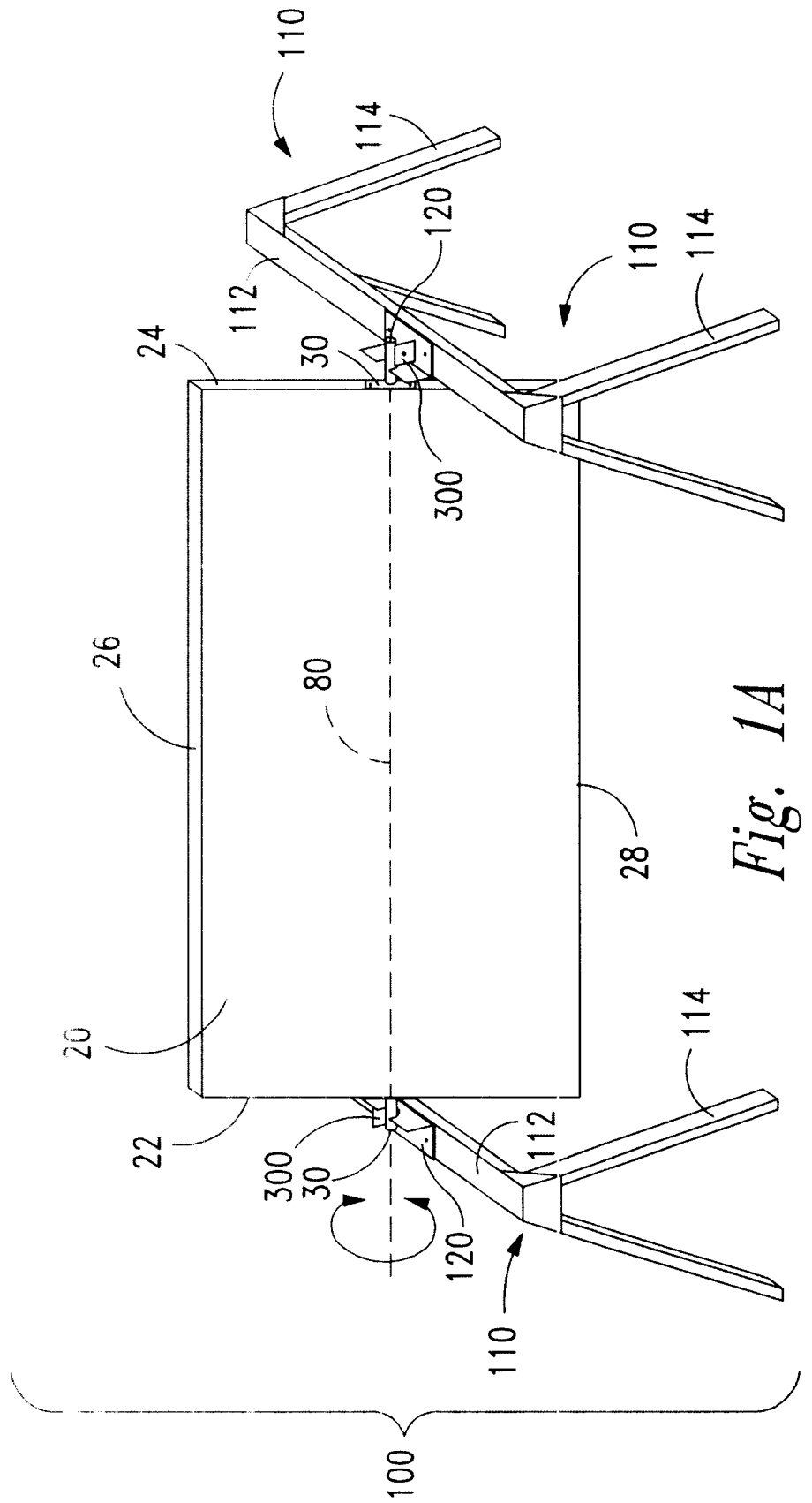

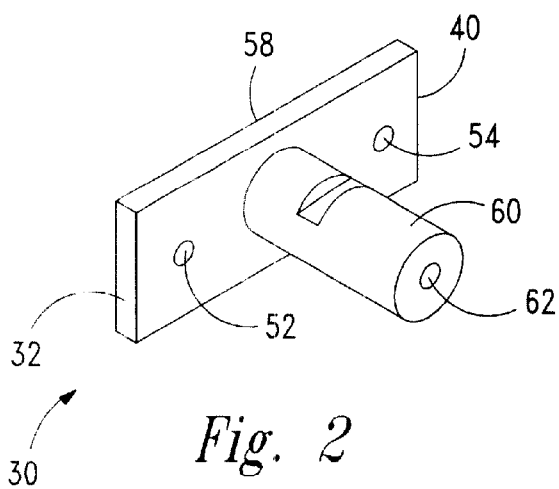
Fig. 2
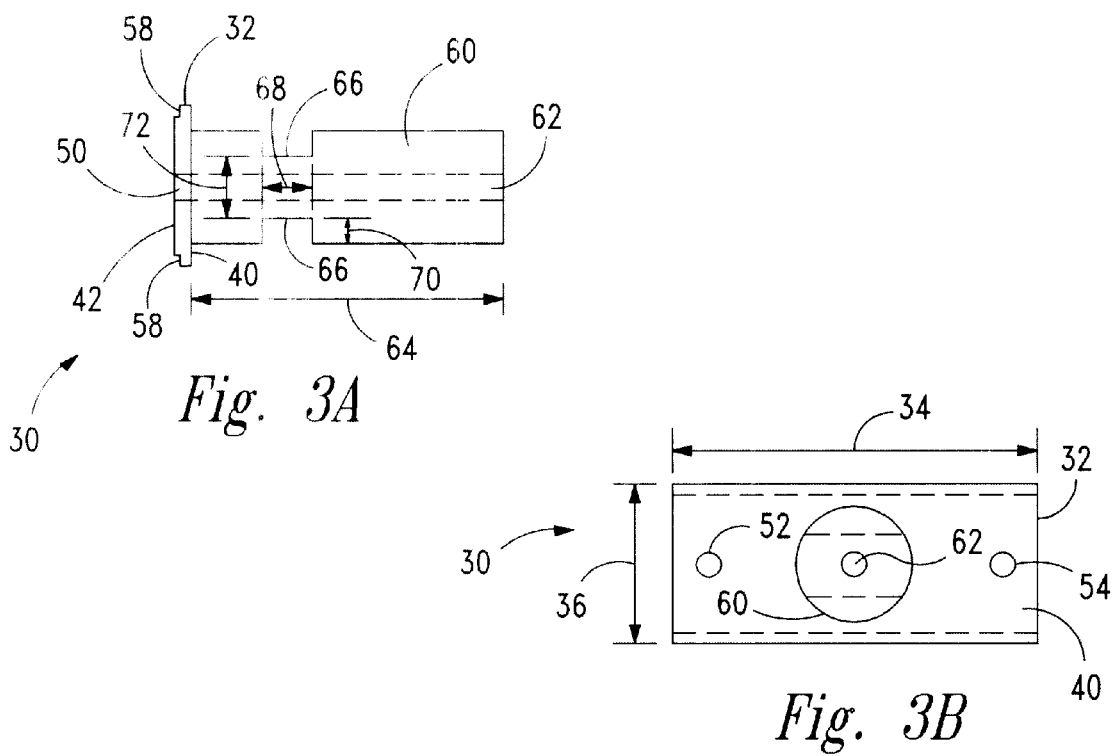
Fig. 3A
Fig. 3B
Fig. 3C

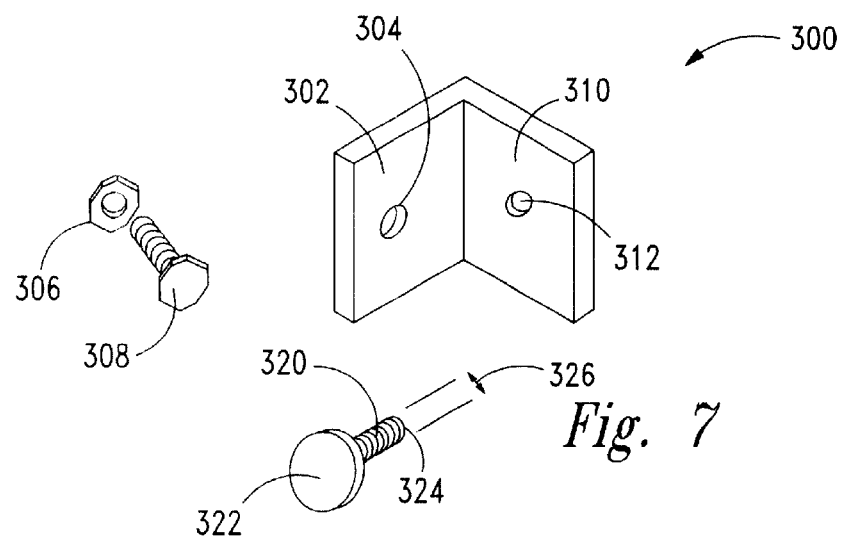
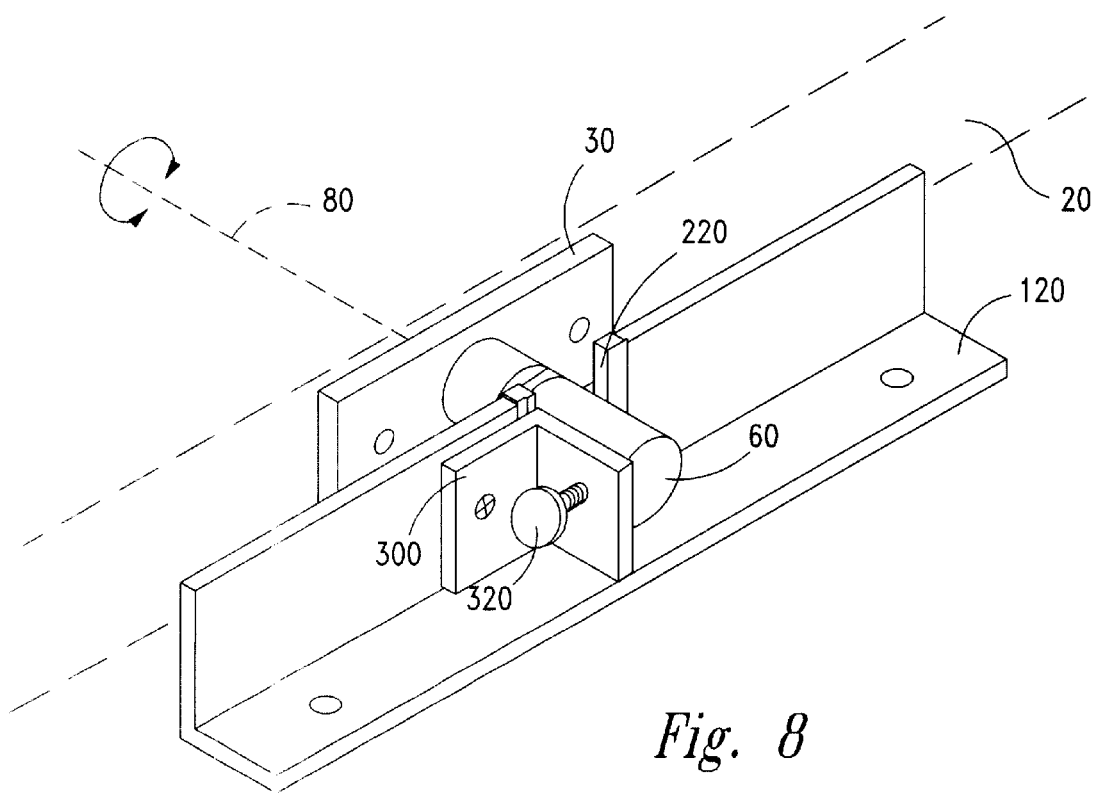

SYSTEM AND METHOD FOR TREATING OBJECT SURFACES

BACKGROUND OF THE INVENTION

1. Field of the Invention

This invention relates in general to a system for holding an object while it is being painted, and more particularly to a system and process for effectively coating and storing a set of objects.

2. Description of the Related Art

Over the years, several techniques have been used to apply a protective or appearance coating or surface treatment to a door. For a homeowner, the technique typically involves using a brush or roller to apply a treatment coating to a door while it remains on hinges. Although this technique prevents the backbreaking task of removing and transporting the door, it does involve the time consuming task of masking and covering a portion of the room surrounding the door. In turn, because a treatment coating may have an unpleasant odor and require a prolonged period of time to cure and set, the homeowner may need to leave the room or worry about others touching the door for hours after the treatment has been applied.

When multiple doors, shutters, or other objects require surface treatments, which is usually the case at construction sites, the above method is not practical because numerous workers may continually move in and out of any or all rooms at the site. Consequently, a current method used for the treatment of multiple objects involves leaning the objects against various walls of a large room, such as a garage, and applying the treatment coating to a first side. The doors are left leaning against the wall while the treated side cures and sets, after which the other side is treated.

Although this method preoccupies only one room for the duration of the treatment, curing and setting process, and allows the painter to use a spray gun to expedite the treatment process, it clutters the room with multiple doors. In turn, these precariously standing doors occupy a significant amount of space. As a result, various forgetful individuals may pass by and accidentally graze or brush against one of the doors, possibly creating a domino effect relative to other treated doors, thereby undesirably forcing a worker to repeat the treatment process.

To expedite the application of a treatment coating to an object, various systems have been introduced. In general, these systems vertically position a door in an apparatus that allows the door to rotate. With this method, both sides of the door can be treated without having to wait for the other side to dry. However, these systems are cumbersome and typically quite expensive. Unless several such systems are present, a worker must undesirably wait for the treatment to cure and set before another door can be treated.

The present invention is directed to overcoming one or more of the problems set forth above.

SUMMARY OF THE INVENTION

The present invention comprises a system and method for treating object surfaces. In the context of the present invention, an object may be a piece of lumber, a door, a shutter, a window frame, or a similar structure that requires one or more surface treatments such as painting. The system comprises a first object hanger that is mounted to a first end of an object; a second object hanger mounted to a second end of the object; a treatment apparatus; and a storage apparatus. An object hanger comprises a plate upon which a shaft is centrally seated. The plate includes holes that facilitate attachment of the object hanger to the object via screws or other types of fasteners or securing devices. The shaft includes a first and a second recessed channel that are preferably offset toward the plate relative to the midpoint of the shaft's length, and which form a pinch width smaller than the shaft's diameter.

The treatment apparatus serves as a station that holds an object in a horizontal position, while allowing the object to be selectively rotated about an axis that extends from the shaft of the first object hanger to that of the second object hanger. The object may be securely positioned in any desired rotational orientation about this axis, thereby facilitating easy application of treatments to particular object surfaces.

The treatment apparatus comprises a first and a second stand, each of which includes a supporting brace. The supporting brace comprises an L-shaped bar having a cutout portion. A supporting insert fits into the cutout portion. The supporting insert includes a U-shaped recess capable of receiving and cradling an object hanger's shaft. The treatment apparatus further comprises a positioning attachment that mounts to each supporting brace. The positioning attachment comprises an L-shaped bar and a snug screw. The positioning attachment's L-shaped bar includes a threaded opening into which the snug screw is inserted. Tightening the snug screw past a certain point causes the end of the snug screw to firmly press against the shaft of an object hanger cradled in the supporting brace.

When an object hanger's shaft is placed in the supporting insert's U-shaped recess, the shaft, and hence the object, may be easily rotated 360 degrees as long as the snug screw has not been tightened against the shaft. Once the snug screw has been tightened to an extent that it firmly presses against the shaft, the object hanger, and hence the object, are maintained in a fixed position. By loosening and then retightening the snug screw, a user or worker may reposition the object in the treatment apparatus as desired, thereby facilitating easy application of treatments to the object's surfaces.

The storage apparatus serves as a station at which multiple objects may be stored in close proximity in a side-by-side manner. Each object may be placed in the storage apparatus immediately following surface treatment, such that the surfaces of multiple objects may be simultaneously drying or curing while the objects reside in the storage apparatus.

The storage apparatus comprises a first and second stand. The first stand includes a storage anchoring brace, which comprises an L-shaped bar having at least one cutout portion and a set of anchoring inserts. Each anchoring insert fits into a cutout portion, and includes an anchoring recess. The anchoring recess is shaped to fit an object hanger shaft's pinch width, and hence the anchoring recess is narrower than the diameter of the shaft.

The second stand includes a storage support brace, which comprises an L-shaped bar having at least one cutout portion, and a set of supporting inserts of the type previously described. Each supporting insert fits into one of the storage support brace's cutout portions.

To place an object in the storage apparatus, the user positions one object hanger shaft in the supporting insert of the storage support brace and the other object hanger shaft in the storage anchoring brace's anchoring insert. The anchoring insert receives the portion of the object hanger shaft defined by the pinch width, and hence the object is securely held or maintained in a predetermined position in the storage apparatus. The storage apparatus allows multiple objects to dry or cure in a minimal amount of space, while securely isolating the objects from each other.

BRIEF DESCRIPTION OF THE DRAWINGS

FIGS. 1A and 1B illustrate a perspective view of a system for treating and storing an object in accordance with the present invention.

FIG. 2 is a perspective view of an object hanger of the present invention.

FIG. 3A–C illustrate a side, front and back view, respectively, of the object hanger shown in FIG. 2.

FIG. 7 is a perspective view of a positioning attachment of the present invention.

FIG. 8 is a perspective view of the object hanger of FIG. 6 being secured within the supporting brace by the positioning attachment of FIG. 7.

DETAILED DESCRIPTION OF THE INVENTION

Figure 1B:
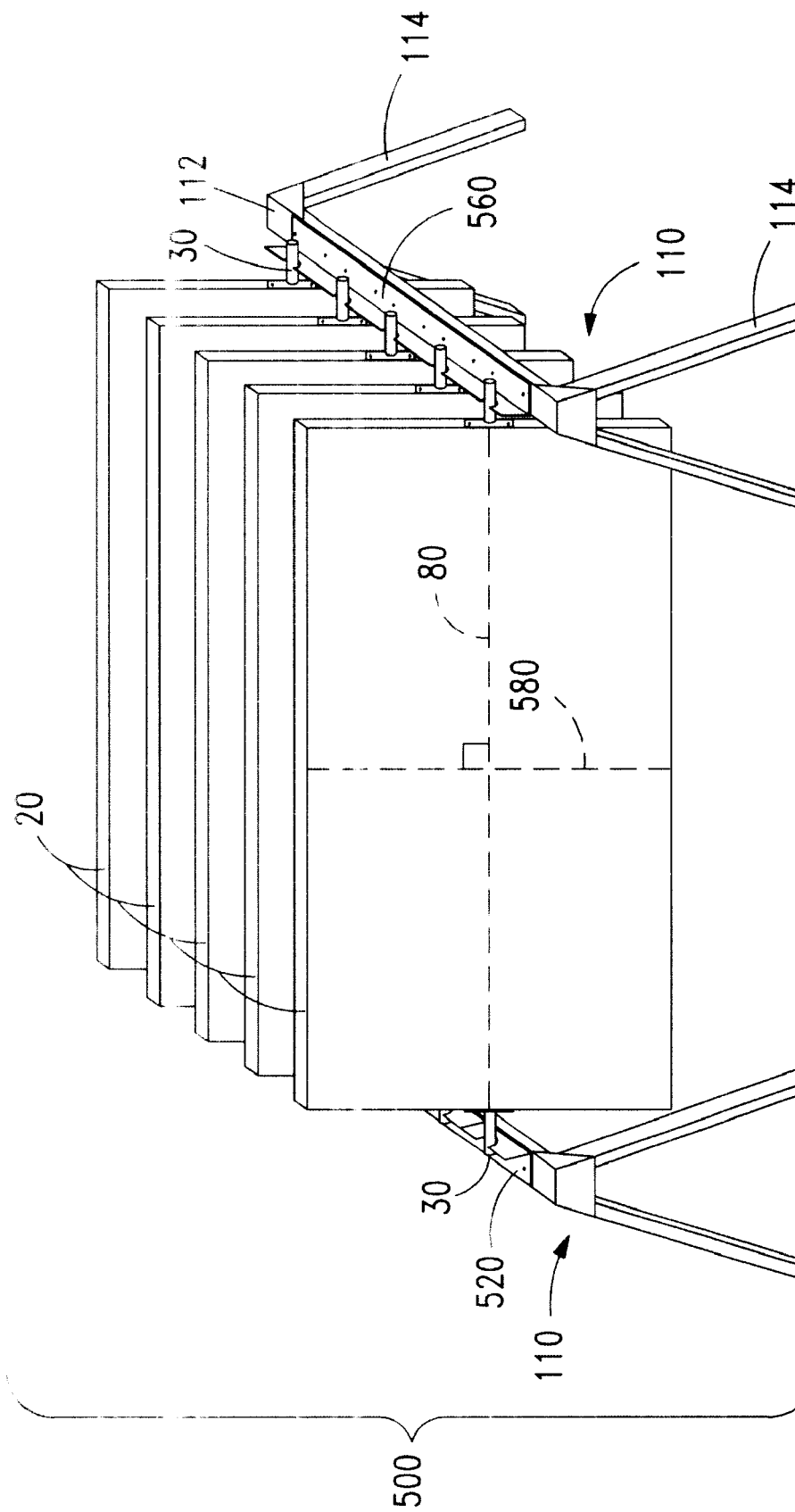

FIGS. 1A and 1B illustrate a perspective view of a preferred embodiment of a system 10 for treating object surfaces and storing the same in accordance with the present invention. In the context of the present invention, an object 20 may be selected from the group including a piece of lumber, a window frame, a door, a shelf, a shutter, and any generally similar type of structure. The object 20 may be characterized as having a first end 22, a second end 24, a first side 26, and a second side 28. Surface treatments may involve 1) surface preparation, such as cleaning and/or sanding; and/or 2) surface coating, for example, painting, lacquering, or the like. Those skilled in the art will understand that while the object 20 depicted in FIGS. 1A and 1B are rectangular, the teachings of the present invention are applicable to objects 20 having different shapes, such as a door designed for a curved doorway or archway; a circular, triangular, octagonal, or oval window frame, and a 3 dimensional structure.

The system 10 comprises a plurality of object hangers 30, a treatment apparatus 100, and a storage apparatus 500. Object hangers 30 are pairwise mounted upon an object 20, and serve as carrying and supporting arms for horizontally suspending the object 20 in the treatment or storage apparatus 100, 500. The treatment apparatus 100 serves as a station at which a user can selectively rotate and position an object 20 to facilitate easy application of one or more treatments to particular object surfaces. The storage apparatus 500 serves as a station at which multiple objects 20 may reside either prior to treatment, or after treatment while their surfaces dry or cure. The structure and functionality of each of the above system elements are described in detail hereafter.

Object Hanger

FIG. 2 is a perspective view of a preferred embodiment of an object hanger 30 constructed in accordance with the present invention. FIGS. 3A, 3B, and 3C are side, front and back views, respectively, of the object hanger 30 shown in FIG. 2. The object hanger 30 comprises a plate 32 upon which a shaft 60 is centrally mounted or seated. The plate 32 is generally rectangular, and may be characterized by a length 34, a width 36, a front side 40, and a backside 42. The plate 32 includes a first, a second, and a third hole 50, 52, 54 that facilitate attachment of the plate 32 to the object 20 via screws or other securing devices. Preferably, the plate 32 is secured to the object's first or second end 22, 24 in a central position relative to the object's first and second sides 26, 28. The first hole 50 is centrally located relative to the plate's length 34 and width 36, while the second and third holes 52, 54 are offset relative to the first hole 50 toward the edges of the plate 32 that span the plate's width 36.

The plate's width 36 is preferably equal to or less than the thickness of the object 20. The plate 32 includes a first and a second beveled edge 58 along the length 34 of its bottom side 42, where such beveled edges 58 prevent buildup of paint or other coating material upon the object 20 in the vicinity of the plate's length 34.

The shaft 60 comprises a rigid cylinder having a central opening or hole 62 disposed throughout its length 64. The shaft 60 is seated on the plate 32 such that shaft's central opening 62 aligns with the plate's first hole 50. If desired, the passage-way created by opening 62 and hole 50 through the shaft 60 and plate 32, respectively, could be used to allow a securing screw or bolt to attach the shaft 60 and plate 32 to an object to be painted. The shaft 60 has a diameter that is preferably slightly less than the plate's width 36. The plate 32 and shaft 60 may be welded or secured together in a conventional manner, or, alternatively, cast from a single piece of material.

The shaft 60 also includes a first and a second recessed channel or groove 66 disposed perpendicular to its length 64, where each such channel 66 has a characteristic width 68 and depth 70. The recessed channels 66 are offset toward the plate 32 relative to the midpoint of the shaft's length 64. The channels 66 act as guides for anchoring the object hanger 30 upon the storage apparatus 500, as described in detail below. The distance from the deepest part of the first recessed channel 66 to the deepest part of the second recessed channel 66 is defined herein as a pinch width 72.

Referring also again to FIG. 1, a pair of object hangers 30 are mounted on the first and second ends 22, 24 of each object 20. Each object hanger shaft 60 is essentially parallel to the object's first and second sides 26, 28. Therefore, a central reference line or support axis 80 may be defined, which runs from the central opening 62 of the shaft 60 mounted or attached to the object's first end 22, through the object, to the central opening 62 of the shaft 60 mounted at the object's second end 24.

In an exemplary embodiment, the plate 32 and the shaft 60 are made of a rigid material such as steel or plastic. The plate's length 34, width 36, and thickness are 4, 1 and ¼ inches, respectively. The plate's first, second, and third holes 50, 52, 54 each have a diameter of 3/16 inches. The shaft 60 is 1 inch in diameter and 3½ inches long, and each recessed channel 66 is ½ wide and 3/16 inches deep.

Figure 3D:
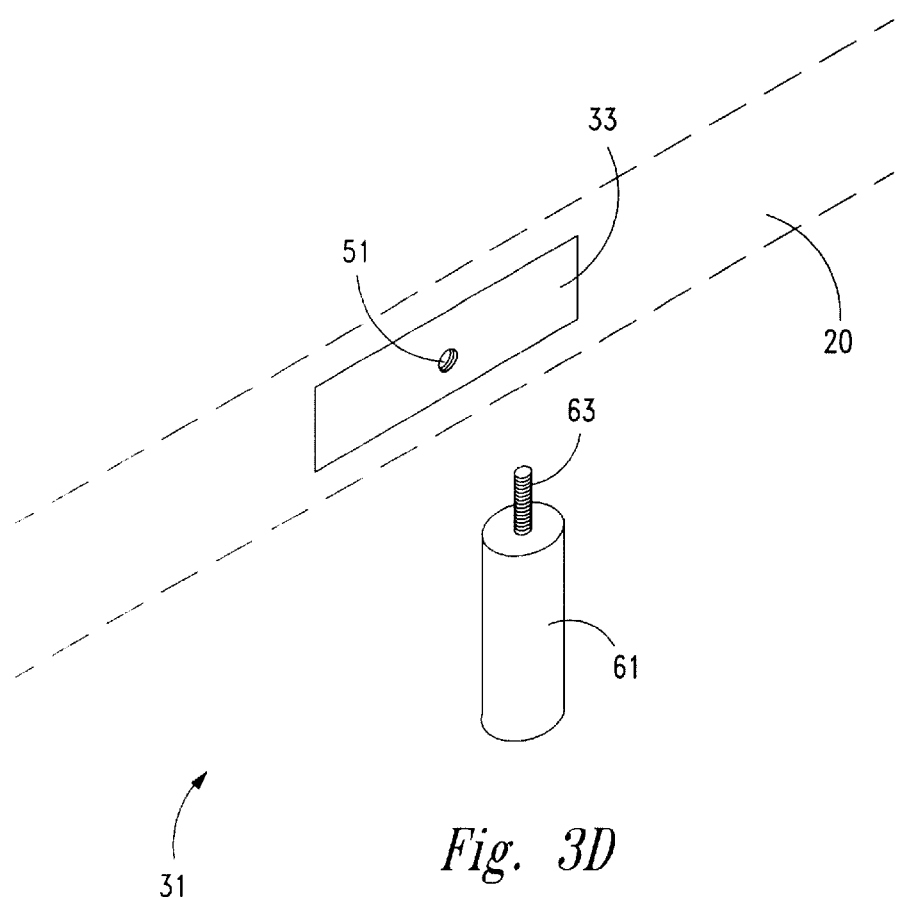
FIG. 3D is a perspective view of an alternate embodiment of an object hanger of the present invention.

FIG. 3D is a perspective view of an alternate embodiment of an object hanger 31 constructed in accordance with the present invention. In the alternate embodiment, the object hanger 31 comprises a plate 33 and a shaft 61. The plate includes a centrally positioned threaded hole 51. The plate 33 may further include a set of mounting holes, in a manner readily understood by those skilled in the art. The shaft 61 includes a threaded nipple 63 that can be screwed into the threaded hole 51 in a conventional manner. A manufacturer could embed a first and a second plate 31 into the first and second ends 22, 24 of a door or shelf, for instance, during a manufacturing process. The nippled shaft 61 could then be selectively employed to aid product conveyance, inspection, and/or repair during the manufacturing process.

Treatment Apparatus

Referring again to FIG. 1, the treatment apparatus 100 comprises a first and a second stand 110; a first and a second supporting brace 120; and a first and a second positioning attachment 300. Those skilled in the art will recognize from FIG. 1 that the treatment apparatus 100 suspends the object 20 using the object hangers 30 mounted thereto, such that the above-mentioned support axis 80 is parallel or essentially parallel to the ground.

Each stand 110 serves as a platform for supporting an object hanger 30 that is mounted to an object 20, and comprises a beam 112 supported or elevated by a first and a second support member 114. The beam 112 is preferably a conventional rigid spanning member, such as a 2×4 or similar type of readily available, conventionally dimensioned piece of lumber. Each support member 114 is preferably a conventional weight-bearing structure, such as a sawhorse. In the preferred embodiment, a user separates the stands 110 by a distance that facilitates the object placement and positioning operations described below.

Those skilled in the art will recognize that each stand 110 may be implemented in a variety of manners. For example, the beam 112 and/or the support members 114 could be implemented using one or more segments of metal or durable plastic tubing such as PVC. Furthermore, the first and second stands 110 could be implemented as a single unit that can be adjusted to vary the distance between and/or the height of the first and second beams 112. Such adjustment may be facilitated using one or more set-screws that may be inserted into particular threaded holes. Nonetheless, implementation of the stands 110 using sawhorses and conventional lumber may be particularly advantageous, since these items are generally inexpensive, and those who perform construction, maintenance, and/or similar types of work commonly have such items on-hand.

Figure 4:
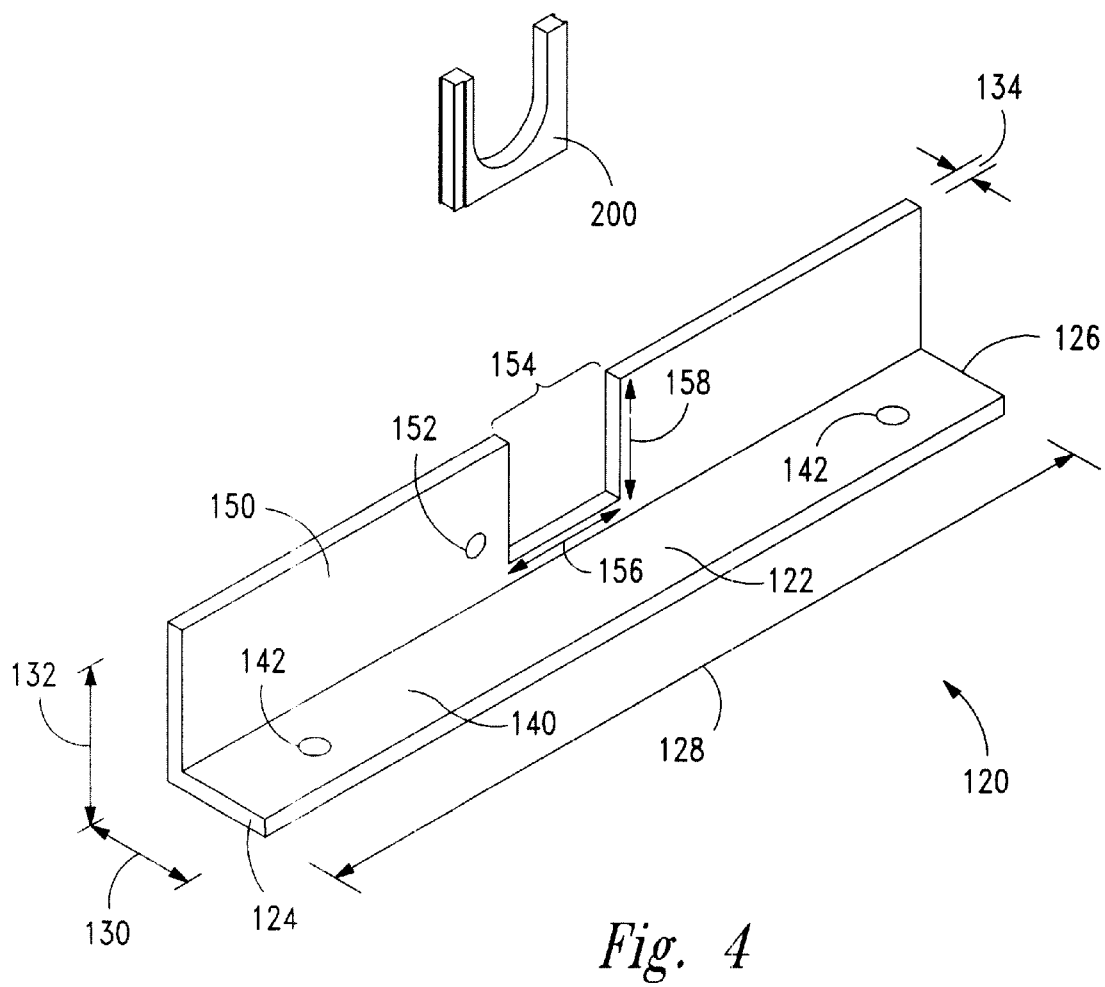
FIG. 4 is a perspective view of a supporting brace of the present invention.

FIG. 4 is a perspective view showing a preferred embodiment of a supporting brace 120 constructed in accordance with the present invention. Each supporting brace 120 is mounted upon a corresponding beam 112, and acts as a low-friction cradle for an object hanger 30 that is mounted upon an object 20 in the manner described above. The supporting brace 120 comprises a supporting member 122 and a supporting insert 200. The supporting member 122 has a first end 124, a second end 126, a length 128, a width 130, a height 132, and a thickness 134, and forms an L-shaped bar having a base portion 140 and a receiving portion 150. The supporting member 122 is preferably manufactured from a durable material such as metal or plastic.

The base portion 140 spans the length 128 and width 130 of the supporting member 122, and includes a first and a second hole 142 that facilitate mounting to the beam 112 via screws. The first and second holes 142 are located in a predetermined position relative to the supporting brace's first and second ends 124, 126 and the base portion's width 130, in the manner shown.

The receiving portion 150 spans the supporting member's length 128 and height 132, and includes a hole 152 and a cutout 154. The hole 152 facilitates mounting the first or second positioning attachment 300 to the receiving portion 150 via a screw, in a manner detailed below with reference to FIGS. 7 and 8. The cutout 154 comprises a square or rectangular recess having a width 156 and a depth 158, and is centrally positioned relative to the supporting member's length 128. The cutout 154 is shaped to receive the supporting insert 200. In an alternative embodiment, the cutout 154 could provide the shape of insert 200 as defined by dimensions 220 and 224. Alternatively, cutout 154 could also provide the shape of insert 600 as defined by dimensions 622 and 624 in FIG. 10.

Figure 5:
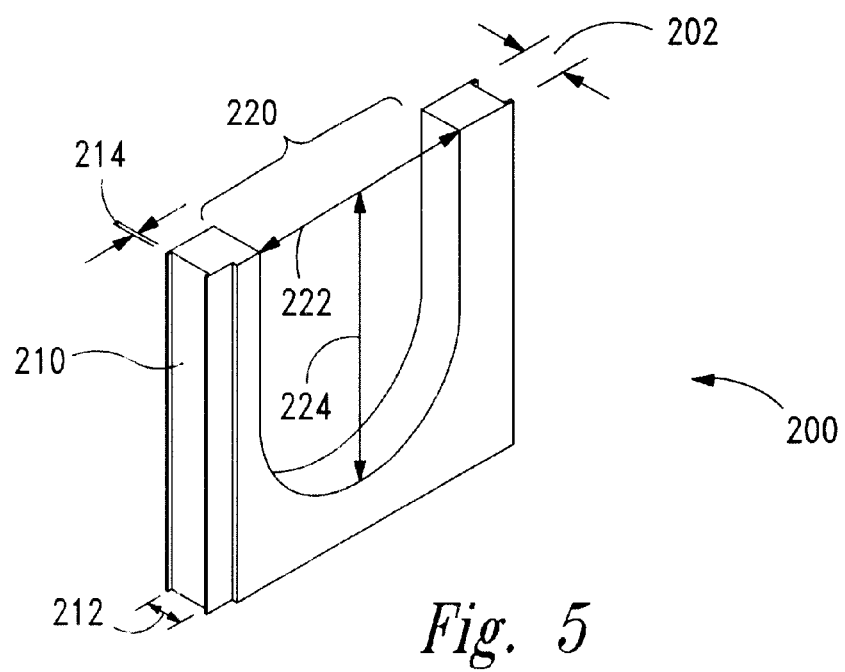
FIG. 5 is a perspective view of a supporting insert of the present invention.

FIG. 5 is a perspective view of a supporting insert 200 constructed in accordance with the present invention. The supporting insert 200 preferably comprises a piece of durable low-friction material such as nylon, polyresin, or plastic having a thickness 202, a peripheral channel 210, and a generally U-shaped recess 220. The peripheral channel 210 is formed in or along three of the supporting insert's four outer edges, and has a width 212 and a depth 214 that ensure that the supporting insert 200 fits tightly into the supporting member's cutout 154. However, to ease the insertion or removal process of the insert 200 into the cutout 154 of supporting member 120, the bottom region of the peripheral channel 210, adjacent the supporting member 122, may be rounded. The peripheral channel's width 212 is therefore essentially equal to, or very slightly larger than, the supporting member's thickness 134. Thus, the supporting insert's overall thickness 202 is greater than that of the supporting member 134. The U-shaped recess 220 may be characterized by a recess width 222 and a recess depth 224, and is sized to readily accommodate the entire diameter of the object hanger's shaft 60.

Figure 6:
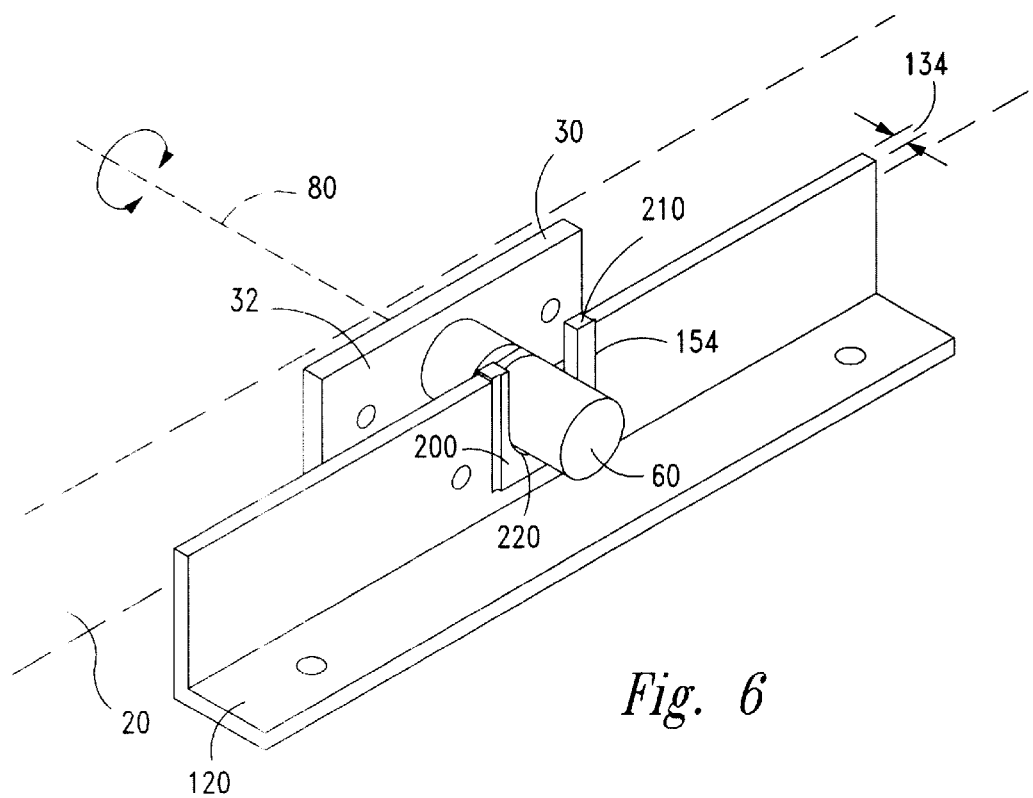
FIG. 6 is a perspective view of an object hanger mounted upon an object and cradled in the supporting brace of FIG. 4.

FIG. 6 is a perspective view of an object hanger 30 mounted upon an object 20 and cradled in the supporting brace 120 of FIG. 4. The supporting insert 200 resides in the supporting member's cutout 154, such that the supporting insert's peripheral channel 210 abuts and surrounds the supporting member's thickness 134 along the edges defining the cutout 154. Additionally, the object hanger 30 rests upon the bottom of the supporting insert's U-shaped recess 220. In the configuration shown in FIG. 6, the object hanger 30, and hence the object 20, can rotate 360 degrees while resting in the supporting brace 120. As described in detail hereafter, the positioning attachment 300 (see FIGS. 1 and 8) mounts to the supporting brace 120, and functions as a restraining or retaining device to maintain the object hanger 30 at a particular rotational orientation.

FIG. 7 is a perspective view showing a preferred embodiment of a positioning attachment 300 constructed in accordance with the present invention. The positioning attachment 300 comprises an L-shaped bar manufactured from a durable material such as metal or plastic. The L-shaped bar includes a mounting portion 302 having a hole 304; a receiving portion 310 having a threaded or tapped opening 312; and a snug screw 320 having a gripping knob or head 322, a contact end 324, and a diameter 326. The hole 304 in the mounting portion 302 may be aligned with the hole 152 in the supporting brace's receiving portion 150, such that a nut 306 and a bolt 308 may be employed to secure the mounting portion 302 to the receiving portion 150. In an alternative embodiment, the hole 152 of supporting brace 120 could be threaded to receive bolt 308, thereby eliminating the use of nut 306.

The snug screw 320 is inserted into the threaded opening 312 in a conventional screw-wise manner. A user preferably adjusts the snug screw 320 such that it's contact end 324 will not touch an object hanger's shaft 60 when the shaft 60 is initially placed in the supporting insert's U-shaped recess 220 (see FIG. 8). Once the user has seated the object hanger 30 in the U-shaped recess 220, they may rotate the object 20 around its support axis 80 to a desired orientation. The user may tighten the snug screw 320 such that the contact end 324 securely presses against the object hanger's shaft 60. Friction then prevents the object hanger 30 from rotating, thus maintaining the object 20 in the desired orientation for applying a treatment coating to the object 20.

Those skilled in the art will understand that in an alternate embodiment, the positioning apparatus could be implemented using a conventional electromechanical device that engages with or disengages from the shaft 60 in response to an electrical signal.

FIG. 8 is a perspective view of an object hanger 30 mounted upon an object 20, cradled in the supporting brace 120 of FIGS. 4 and 6, and held by the positioning attachment 300 of FIG. 7 in the rotational orientation shown. In order to reorient the object 20, a user would loosen the snug screw 320 such that its contact end 324 no longer abuts the object hanger 30; rotate the object 20 to another desired position or orientation; and then tighten the snug screw 320 in the manner described above.

In an exemplary embodiment, the supporting brace 120 is fabricated from a metal such as steel or hard plastic, and has a length 128, width 130, height 132, and thickness 134 of 12, 1½, 2, and ¼ inches, respectively. The supporting brace's cutout 154 has a recess depth 158 of 1¾ inches and a recess width 156 of 1½ inches. An exemplary supporting insert 200 is fabricated from a low-friction material such as nylon, and its peripheral channel 210 has a width 212 of ¼ inches and a depth 214 of ⅛ inches. The exemplary supporting insert's U-shaped recess 220 has a recess depth 224 of 1½ inches, and a recess width 222 of 1 inch. Finally, an exemplary positioning attachment 300 is also fabricated from a metal such as steel or a hard plastic, and employs a snug screw 320 having a diameter 326 of ¼ inches. As mentioned earlier, the dimensions of the supporting brace's cutout 154 compliments the outer dimensions of the insert 200 of FIG. 5 and 600 of FIG. 10.

Storage Apparatus

As previously indicated the storage apparatus 500 serves as a temporary repository for holding multiple objects 20. The structure and functionality of the storage apparatus 500 are described in detail hereafter. With reference to the Figures cited above, like reference numbers are relied upon below to identify like elements for ease of understanding.

Referring again to FIG. 1B, the storage apparatus 500 comprises a first and a second stand 110; a storage anchoring brace 520; and a storage supporting brace 560. The first and second stands 110 preferably have essentially the same structure as described above, and are placed or positioned a distance apart that facilitates the object placement operations described below. The storage anchoring brace 520 serves as a rack for receiving one or more object hangers 30 and maintaining them in a predetermined position, thereby preventing the object hangers 30, and hence the objects 20 attached thereto, from rotating. In the present invention, storage axis 580 may be defined that is perpendicular to the aforementioned support axis 80. In the preferred embodiment, the storage anchoring brace 520 essentially fixes or restrains the orientation of the object hangers 30 placed therein, such that the storage axis 580 associated with an object 20 is perpendicular or essentially perpendicular to the ground. Those skilled in the art will understand that in an alternate embodiment, the storage anchoring brace 520 could restrict object hangers' orientation such that objects' storage axes 580 maintain a predetermined angle relative to the ground.

Figure 9:
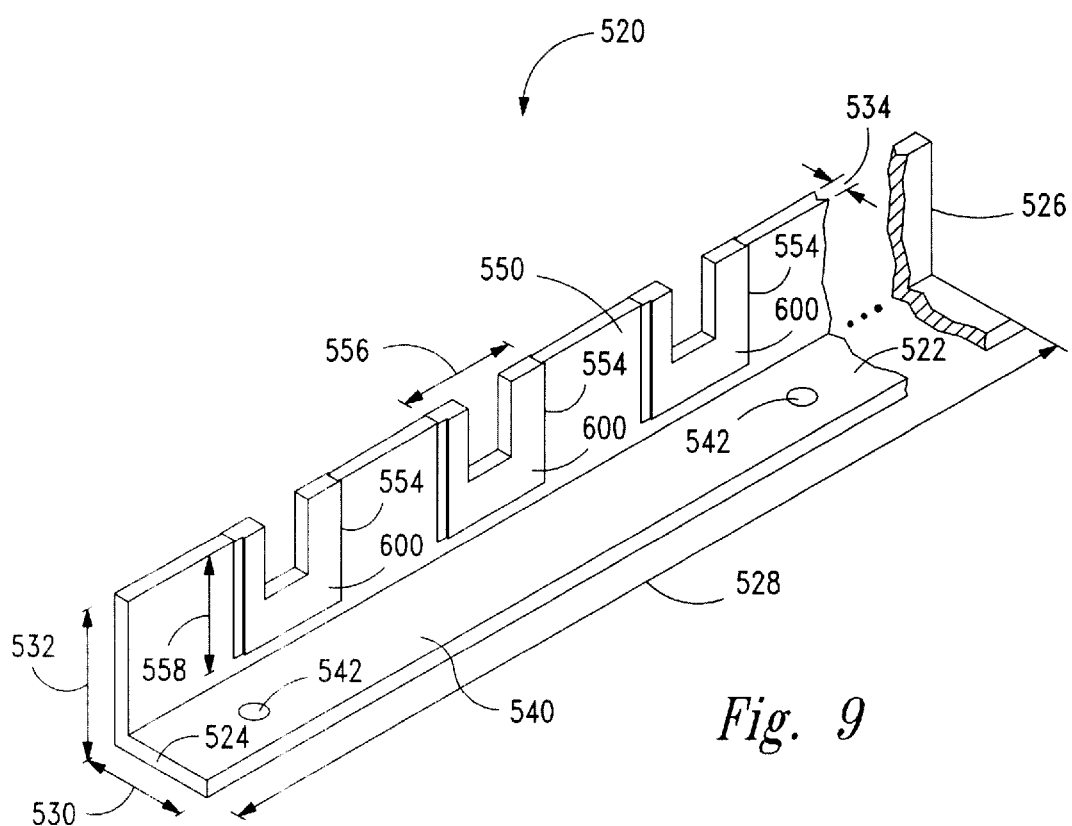
FIG. 9 is a perspective view of a storage anchoring brace constructed in accordance with the present invention.

FIG. 9 is a perspective view showing a preferred embodiment of a storage anchoring brace 520 constructed in accordance with the present invention. The storage anchoring brace 520 comprises a storage-supporting member 522 and a set of anchoring inserts 600. The storage supporting member 522 has a first end 524, a second end 526, a length 528, a width 530, a height 532, and a thickness 534, and forms an L-shaped bar having a base portion 540 and a receiving portion 550.

The base portion 540 spans the length 528 and width 530 of the storage supporting member 522, and includes a plurality of holes 542 along its length 528 that facilitate mounting to a beam 112 via screws (see FIG. 1B). Each hole 542 may be separated by a predetermined distance, for example, 6 inches.

The receiving portion 550 spans the storage supporting member's length 528 and height 532, and includes at least one cutout 554. Each cutout 554 comprises a square or rectangular recess having a width 556 and a depth 558, and which is shaped to receive an anchoring insert 600. The cutouts 554 are preferably positioned a predetermined distance apart from each other, for example, 6 inches. This distance will allow treated or untreated objects being contained by the storage anchoring brace 520 to be closer to each other than if multiple supporting braces 120 where lined-up, end-to-end, across a beam 112 and at least one of the supporting inserts 200 was replaced with an anchoring insert 600.

Figure 10:
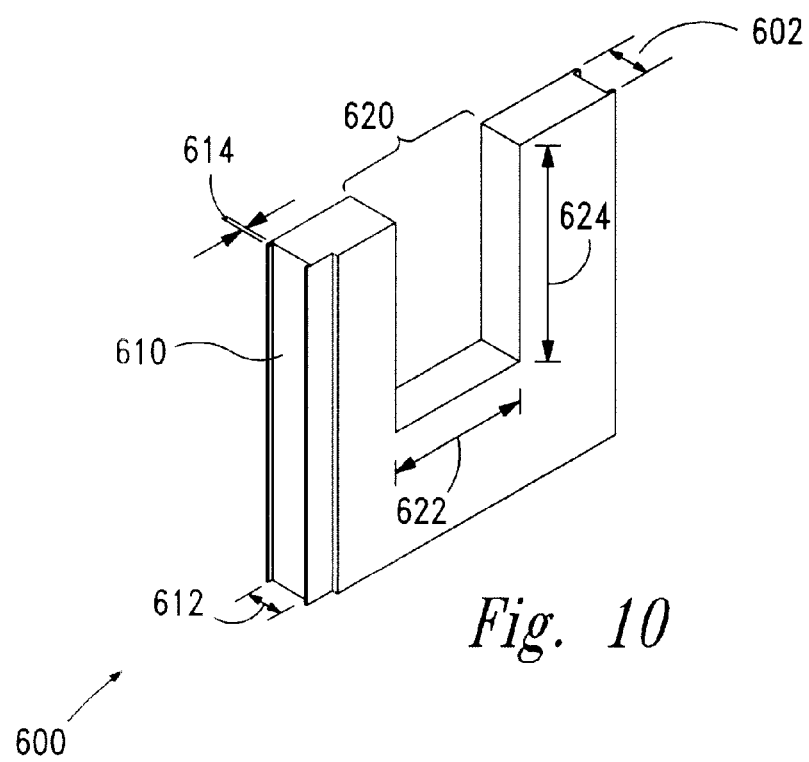
FIG. 10 is a perspective view showing an anchoring insert of the present invention.

FIG. 10 is a perspective view showing an anchoring insert 600 constructed in accordance with the present invention. The anchoring insert 600 preferably comprises a piece of material such as metal, nylon, polyresin, or plastic having a thickness 602, a peripheral channel 610, and a generally U-shaped or rectangular-shaped anchoring recess 620. The peripheral channel 610 is formed in or along three of the anchoring insert's four outer edges, and has a width 612 and a depth 614 that ensure that the anchoring insert 600 fits tightly into a cutout 554 in the storage supporting member 522. However, to ease the insertion or removal process of the insert 600 into the cutout 154 of supporting member 120, the bottom region of the peripheral channel 610, adjacent the supporting member 122, may be rounded. The peripheral channel's width 612 is therefore essentially equal to, or very slightly larger than, the storage supporting member's thickness 534, and hence the anchoring insert's overall thickness 602 is greater than that of the storage-supporting member 522.

The anchoring recess 620 may be characterized by an anchoring width 622 and a recess depth 624. The anchoring width 622 is sized to accommodate an object hanger shaft's pinch width 72. That is, the anchoring recess 620 is narrower than the object hanger shaft's diameter, but slightly wider than its pinch width 72. Thus, to secure an object 20 in the storage anchoring brace 520, a user lowers the object hanger 30 into an anchoring insert 600 such that the object hanger shaft's pinch width 72 is secured or restrained by the anchoring insert's anchoring width 622. This ensures that the object hanger 30, and hence the object 20, cannot appreciably rotate.

In an exemplary embodiment, the storage anchoring brace 520 is made of a metal such as steel or a hard plastic, and has a length 528, width 530, height 532, and thickness 534 of 48, 1½, 2, and ¼ inches, respectively. An exemplary anchoring insert 600 may be fabricated from nylon or other durable material, and has a thickness of ⅜ inches; a peripheral channel 610 with a width 612 and depth 614 of ¼ and ⅛ inches, respectively; and an anchoring recess 620 characterized by an anchoring width 622 of ¾ inches and a recess depth 624 of 1¼ inches.

The storage supporting brace 560 (see FIG. 1B) has essentially the same structure as the storage anchoring brace 520, with the exception that each anchoring insert 600 is replaced with the supporting insert 200 previously described above. Thus, a user may secure an object 20 in the storage apparatus 500 by 1) placing a first object hanger shaft 60 mounted to the object 20 into a supporting insert 200 of the storage supporting brace 560; and 2) placing a second object hanger shaft 60 attached to the object 20 into an anchoring insert 600 of the storage anchoring brace 520. As the anchoring insert 600 ensures that an object 20 secured in this manner cannot appreciably rotate; multiple objects 20 may be secured next to each other in generally close proximity.

Overall Method

In the context of the description above, a user is taken to be a person. Those skilled in the art will readily understand that the present invention may be employed in an automated manufacturing environment, such as an assembly line, in which case the user is defined as a robotic system capable of performing particular actions under computer or processor control. In other words, a user may be a robotic system.

The robotic system includes a set of robotic arms and/or electromechanical actuating devices, where such arms and devices are generally well known. Such robotic arms and/or actuating devices are capable of 1) transporting and/or manipulating objects 20; 2) adjusting, engaging, and/or disengaging particular portions of system 10 of the present invention; and 3) applying surface treatments such as paint to objects 20. The aforementioned types of operations may involve the use of conventional light emitting and light detecting devices to aid position detection, in a manner readily understood by those skilled in the art.

Figure 11:
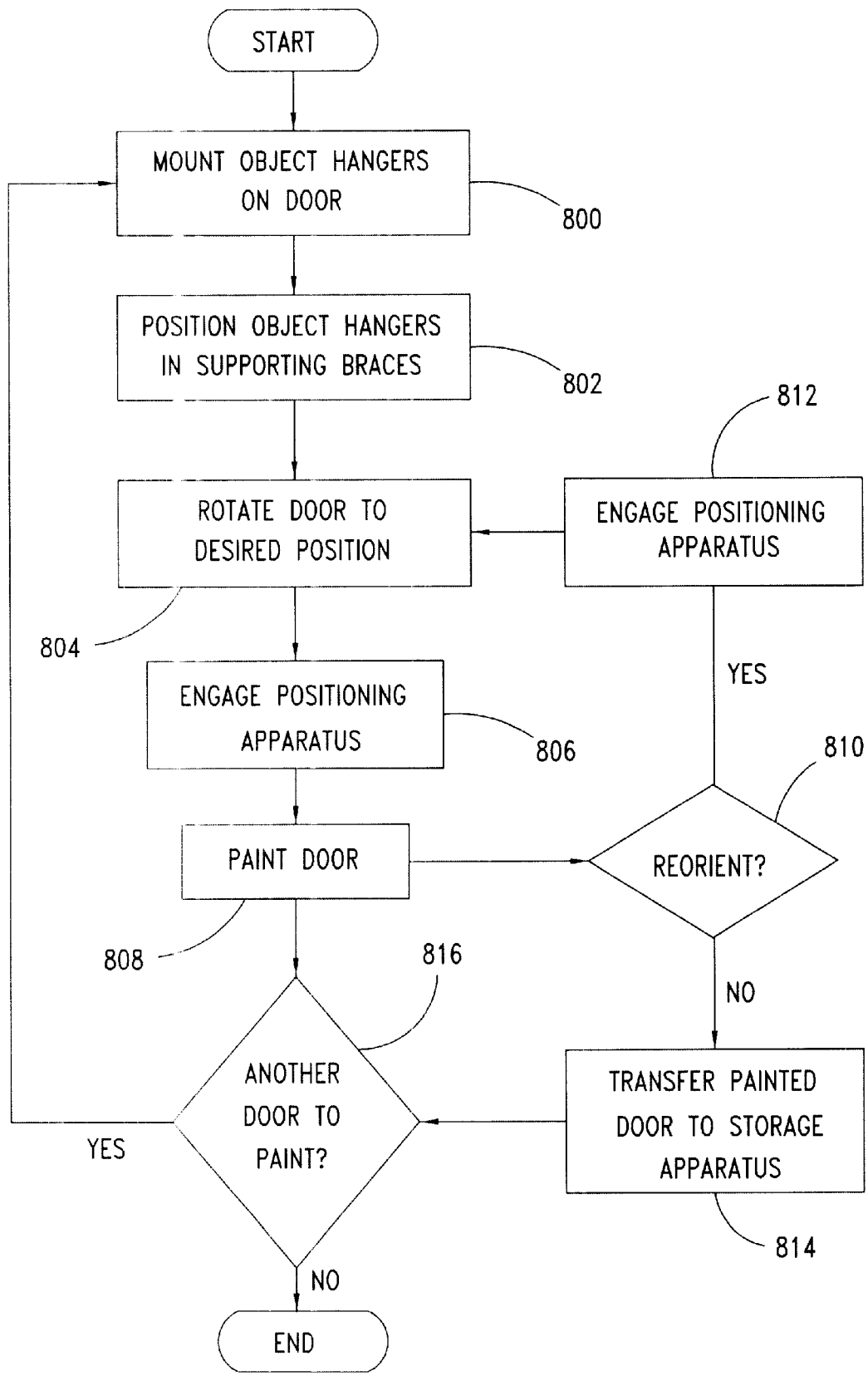
FIG. 11 is a flowchart of a method for treating object surfaces in accordance with the present invention.

FIG. 11 is a flowchart of a preferred method for treating object surfaces in accordance with the present invention. In the description that follows, the object 20 requiring treatment is taken to be a door that requires painting. Those skilled in the art will recognize that the object 20 could be selected from the group including a piece of lumber, a window frame, a shutter or any other type of structure that could accept a treatment. In addition, the following description is directed toward an automated manufacturing process, in which a robotic system performs particular operations using the present invention to produce one or more painted doors. Those skilled in the art will further understand that one or more of the following method steps could be performed manually as depicted in FIGS. 1A and 1B. Consequently, the following will reference the components illustrated in the above figures.

The method begins in step 800, in which the robotic system mounts an object hanger 30 onto each of a door's first and second ends 22, 24. Preferably, the object hangers 30 are mounted such that they are centered relative to the door's first and second sides 26, 28. Next, in step 802, the robotic system positions the door such that the object hanger shafts 60 are cradled in the first and second supporting braces 120. The robotic system subsequently rotates the door about its support axis 80 to place one or more of the door's surfaces in a desired orientation in step 804. Relative to an automated manufacturing process, the desired orientation is preferably predetermined, and may correspond to one of possibly several orientation values stored in a memory. The robotic system then engages the positioning attachment 300 to hold or maintain the door in the desired orientation in step 806, after which the robotic system paints the surface in step 808. After step 808, the robotic system determines whether the door requires reorientation in step 810. If so, the robotic system disengages the positioning apparatus 300 in step 812, after which the method returns to step 804. Otherwise, in the event that the door is ready to be stored for drying, the robotic system removes the painted door from the treatment apparatus 100 and places the door in the storage apparatus 500 in step 814. Step 814 involves placing one object hanger shaft 60 in the storage support brace, and the other object hanger shaft 60 in the storage anchoring brace 520, such that the door cannot rotate to any appreciable extent. Following step 814, the robotic system determines whether another door requires painting in step 816. If so, the method returns to step 800; otherwise, the method ends.

While the present invention has been described above with reference to particular embodiments, those skilled in the art will recognize that various modifications and/or alternate embodiments may be provided. For example, the object hanger 30 could be oval-shaped rather than rectangular. As another example, the treatment apparatus 100 could rely upon a single positioning attachment 300 rather than a positioning attachment 300 for each of the first and second supporting braces 120. These and other modifications are provided by the description herein, which is limited only by the following claims.

What is claimed is:

1. An apparatus for treating a surface of an object, the object having a first end and a second end, the apparatus comprising:

a first and second object hanger respectively mounted on the first and second end of the object; each object hanger includes a plate having an opening and a shaft secured to the plate, wherein a reference line extended through the object between the first and second object hanger defines a support axis; and a stand assembly supporting the first and second object hangers such that the support axis is essentially parallel to the ground, the stand assembly including:

a first and second support; and a first and second brace mounted to the first and second support, each brace including a U-shaped cradle for holding the shaft of the first and second object hanger, and wherein the first and second shaft can rotate around the support axis while positioned in the first and second U-shaped cradles.

2. The apparatus of claim 1, wherein the stand assembly further comprises a positioning apparatus that can be selectively engaged to maintain the object in a particular rotational orientation.

3. The apparatus of claim 2, wherein the positioning apparatus comprises a snug screw.

4. An apparatus for storing a first object and a second object, each object having a first end, a second end, a first side, and a second side, the apparatus comprising:

a first object hanger mounted upon the first end of the first object;

a second object hanger mounted upon the second end of the first object, wherein a reference line extended through the first object from the first object hanger to the second object hanger defines a first support axis, and wherein a first storage axis is perpendicular to the first support axis;

a third object hanger mounted upon the first end of the second object;

a fourth object hanger mounted upon the second end of the second object, wherein a line extended through the second object from the third object hanger to the fourth object hanger defines a second support axis, and wherein a second storage axis is perpendicular to the second support axis; and a stand assembly supporting each object hanger such that each support axis is essentially parallel to the ground and each storage axis maintains a predetermined and essentially constant orientation relative to the ground.

5. The apparatus of claim 4, wherein the predetermined orientation of each storage axis relative to the ground is vertical.

6. The apparatus of claim 4, wherein each object hanger comprises:

a plate having an opening; and a shaft secured to the plate, the shaft characterized by a diameter, the shaft including a first recessed channel and a second recessed channel that define a pinch width narrower than the shaft diameter.

7. The apparatus of claim 6, wherein the stand assembly comprises:

a first support;

a second support; and a set of leg members maintaining the first and second supports in an essentially horizontal position.

8. The apparatus of claim 7, wherein the stand assembly further comprises a first brace mounted to the first support, the first brace including a U-shaped recess, the U-shaped recess having a width smaller than a shaft diameter and slightly larger than a shaft pinch width.

9. The apparatus of claim 8, wherein the stand assembly further comprises a second brace mounted to the second support, the second brace including a U-shaped cradle for accommodating a shaft diameter.

10. A method for treating a surface of an object, the object including a first end and a second end, the method comprising the steps of:

mounting a first object hanger to the first end of the object;

mounting a second object hanger to the second end of the object, wherein a reference line extended through the object from the first object hanger to the second object hanger defines a support axis;

suspending the mounted object hangers using a first stand assembly, such that the support axis is essentially parallel to the ground;

rotating the object about the support axis to a first desired position; and applying a treatment to the object.

11. The method of claim 10, further comprising the steps of engaging a positioning apparatus, after the step of rotating the object, to maintain the object in the first desired position.

12. The method of claim 11, further comprising the steps of:

disengaging the positioning apparatus;

rotating the object about the support axis to a second desired position; and engaging the positioning apparatus to maintain the object in the second desired position.

13. The method of claim 12, further comprising the steps of:

transferring the object to a second stand assembly, wherein the second stand assembly holds the first object hanger in an essentially constant predetermined position.

14. The method of claim 10, wherein a subset of the steps are performed by an automated system as part of an automated manufacturing process.

* * * * *